United States Patent
Brawer et al.

(10) Patent No.: US 9,002,819 B2
(45) Date of Patent: Apr. 7, 2015

(54) WEB CRAWLER SCHEDULER THAT UTILIZES SITEMAPS FROM WEBSITES

(71) Applicant: Google Inc., Mountain View, CA (US)

(72) Inventors: Sascha B. Brawer, Berne (CH); Maximilian Ibel, Pfaeffikon (CH); Ralph Michael Keller, Zumikon (CH); Narayanan Shivakumar, Kirkland, WA (US)

(73) Assignee: Google Inc., Mountain View, CA (US)

(*) Notice: Subject to any disclaimer, the term of this patent is extended or adjusted under 35 U.S.C. 154(b) by 69 days.

(21) Appl. No.: 13/858,872

(22) Filed: Apr. 8, 2013

(65) Prior Publication Data

US 2013/0226898 A1    Aug. 29, 2013

Related U.S. Application Data

(63) Continuation of application No. 13/271,160, filed on Oct. 11, 2011, now Pat. No. 8,417,686, which is a continuation of application No. 12/823,358, filed on Jun. 25, 2010, now Pat. No. 8,037,054, which is a continuation of application No. 11/172,764, filed on Jun. 30, 2005, now Pat. No. 7,769,742.

(60) Provisional application No. 60/686,494, filed on May 31, 2005.

(51) Int. Cl.
  G06F 7/00    (2006.01)
  G06F 17/30    (2006.01)

(52) U.S. Cl.
  CPC ................................ G06F 17/30864 (2013.01)

(58) Field of Classification Search
  None
  See application file for complete search history.

(56) References Cited

U.S. PATENT DOCUMENTS

| | | |
|---|---|---|
| 5,935,210 A | 8/1999 | Stark |
| 5,958,008 A | 9/1999 | Pogrebisky et al. |
| 6,124,966 A | 9/2000 | Yokoyama |
| 6,144,959 A | 11/2000 | Anderson et al. |
| 6,269,370 B1 | 7/2001 | Kirsch |
| 6,271,840 B1 | 8/2001 | Finseth et al. |
| 6,285,999 B1 | 9/2001 | Page |
| 6,321,265 B1 | 11/2001 | Najork et al. |
| 6,418,433 B1 | 7/2002 | Chakrabarti et al. |
| 6,421,724 B1 | 7/2002 | Nickerson et al. |
| 6,424,966 B1 | 7/2002 | Meyerzon et al. |

(Continued)

OTHER PUBLICATIONS

Marc D McSwain et al., "Description of a web site map and ohter hypertext networks using an XML grammar", Jun. 22, 2005, IBM, pp. 1-5.*

(Continued)

*Primary Examiner* — Robert W. Beausoliel
*Assistant Examiner* — Hexing Liu
(74) *Attorney, Agent, or Firm* — Morgan, Lewis & Bockius LLP

(57) ABSTRACT

Systems and methods for scheduling documents for crawling are disclosed. In some implementations, a method includes obtaining sitemap information for a plurality of websites; and analyzing the sitemap information to identify a website, in the plurality of websites. The website has sitemap information that is at least potentially out of date. The method also includes updating the sitemap information for the identified website by downloading updated sitemap information for the identified website; and scheduling documents for crawling in accordance with the updated sitemap information for the identified website.

33 Claims, 7 Drawing Sheets

(56) References Cited

U.S. PATENT DOCUMENTS

| | | |
|---|---|---|
| 6,516,337 B1 | 2/2003 | Tripp et al. |
| 6,525,748 B1 | 2/2003 | Belfiore et al. |
| 6,636,854 B2 | 10/2003 | Dutta et al. |
| 6,732,105 B1 | 5/2004 | Watson, Jr. et al. |
| 6,957,383 B1 | 10/2005 | Smith |
| 6,976,053 B1 | 12/2005 | Tripp et al. |
| 6,983,282 B2 | 1/2006 | Stern et al. |
| 7,133,870 B1 | 11/2006 | Tripp et al. |
| 7,139,747 B1 | 11/2006 | Najork |
| 7,191,210 B2 | 3/2007 | Grossman |
| 7,769,742 B1 | 8/2010 | Brawer et al. |
| 7,774,782 B1 | 8/2010 | Popescu et al. |
| 7,844,610 B2 | 11/2010 | Hillis et al. |
| 7,987,172 B1 | 7/2011 | Carver |
| 2002/0032772 A1 | 3/2002 | Olstad et al. |
| 2002/0052928 A1 | 5/2002 | Stern et al. |
| 2002/0061029 A1 | 5/2002 | Dillion |
| 2002/0087515 A1 | 7/2002 | Swannack et al. |
| 2002/0138582 A1 | 9/2002 | Chandra et al. |
| 2003/0028896 A1 | 2/2003 | Swart et al. |
| 2003/0208482 A1 | 11/2003 | Kim et al. |
| 2004/0030683 A1 | 2/2004 | Evans et al. |
| 2004/0093327 A1 | 5/2004 | Anderson et al. |
| 2004/0122686 A1 | 6/2004 | Hill et al. |
| 2004/0143787 A1 | 7/2004 | Grancharov et al. |
| 2004/0158617 A1 | 8/2004 | Shanny et al. |
| 2004/0168066 A1 | 8/2004 | Alden |
| 2004/0221289 A1 | 11/2004 | D'Souza et al. |
| 2005/0022928 A1 | 2/2005 | Yamada |
| 2005/0060286 A1 | 3/2005 | Hansen et al. |
| 2005/0138435 A1 | 6/2005 | Kaufman et al. |
| 2005/0256865 A1 | 11/2005 | Ma et al. |
| 2006/0004691 A1 | 1/2006 | Sifry |
| 2006/0070022 A1 | 3/2006 | Ng et al. |
| 2006/0080405 A1 | 4/2006 | Gibson |
| 2006/0106866 A1 | 5/2006 | Green et al. |
| 2006/0212451 A1 | 9/2006 | Serdy et al. |
| 2007/0011168 A1 | 1/2007 | Keohane et al. |
| 2007/0050338 A1 | 3/2007 | Strohm et al. |
| 2007/0067395 A1 | 3/2007 | Blinn et al. |
| 2008/0021904 A1 | 1/2008 | Garg et al. |

OTHER PUBLICATIONS

"Technorati: Ping Configurations," http://web.archive.org/web/20040829035832/www.technorati.com/de . . . , Aug. 2004, 5 pgs.

"SOAP Meets RSS," http://blogs.law.harvard.edu/tech/soapMectsRss, Jul. 17, 2003, 3 pgs.

"The Open Archives Initiative Protocol for Metadata Harvesting," Ver. 2.0, http://www.openarchives.org/OAI/openarchivesprotocol.html, Jun. 14, 2002, 37 pgs.

"Hermetic Sitemap Builder," http://www.hermetic.ch/smb.htm, pp. 1-3 [no date supplied or on document], 3 pgs.

"Yahoo! Free Sitemaps," http://www.seroundtable.com/archives/002421.html, Aug. 2005, pp. 1-2.

"Yahoo! Sitemap Feed Submission . . . Worth the Effort?" http://www.antezeta.com/yahoo/site-map-feed.html, 2005, pp. 1-7.

"What are Sitemaps?" www.sitemaps.org, Aug. 2005, 1 page.

"Archive for the 'Site Explorer' Category, ," http://www.ysearchblog.com/category/site-explorer/page/3/, 2005, pp. 1-3.

"The Optimizer-Weekly SEO News," http://www.increased-online-traffic.com/2005/8/yahoo-adopts-site-maps-urllisttxt.asp, Aug. 23, 2005, pp. 1-5.

"Archive for the 'Site Explorer' Category," http://www.ysearchblog.com/category/site-explorer/page/2/, Jun. 2, 2006, p. 1-11.

"Build your Site Map Online," http://www.xml-sitemap.com, 2005, pp. 1-2.

Microsoft Computer Dictionary, Fifth Edition, © 2002, p. 445, 3 pages.

Dikaiakos, Characterizing Crawler Behavior for Web Server Access Logs, EC-Web 2003, LNCS 2738, pp. 369-378, 2003.

\* cited by examiner

WEB CRAWLER SCHEDULER THAT UTILIZES SITEMAPS FROM WEBSITES

RELATED APPLICATIONS

This application is a continuation of U.S. patent application Ser. No. 13/271,160, filed Oct. 11, 2011, now U.S. Pat. No. 8,417,686, which is a continuation of U.S. patent application Ser. No. 12/823,358, filed Jun. 25, 2010, now U.S. Pat. No. 8,037,054, which is a continuation of U.S. patent application Ser. No. 11/172,764, filed Jun. 30, 2005, now U.S. Pat. No. 7,769,742, which claims the benefit of U.S. Provisional Patent Application No. 60/686,494, filed May 31, 2005, entitled "Web Crawler Scheduler that Utilizes Sitemaps from Websites."

All above-identified patents and patent applications are hereby incorporated by reference in their entireties.

TECHNICAL FIELD

The disclosed embodiments relate generally to search engines. More particularly, the disclosed embodiments relate to a web crawler scheduler that utilizes sitemaps from websites.

BACKGROUND

A search engine is a tool that identifies documents, typically stored on hosts distributed over a network, which satisfy search queries specified by users. Web search engines work by storing information about a large number of documents (such as web pages) which they retrieve from the World Wide Web (WWW) via a web crawler. The web crawler follows links (also called hyperlinks) found in crawled documents so as to discover additional documents to download. This is also known as discovery-based crawling.

Discovery-based crawling has some shortcomings. One shortcoming is that the crawl coverage may be incomplete, as there may be documents that the crawler is not able to discover merely by following links. Also, the crawler might fail to recognize some links that are embedded in menus, JavaScript scripts, and other web-based application logic, such as forms that trigger database queries. Another shortcoming is that the crawler may not know if a document has changed since a prior crawl, and thus may be skipped during a current crawling cycle. Yet another shortcoming is that the crawler does not know when it should crawl a particular website and how much load to put on the website during the crawling process. Crawling a website during high traffic periods and/or excessive load during crawling can deplete network resources from the website, rendering the website less accessible to others.

BRIEF DESCRIPTION OF THE DRAWINGS

Like reference numerals refer to corresponding parts throughout the drawings.

SUMMARY

Systems and methods for scheduling documents for crawling are disclosed. In some implementations, a method includes obtaining sitemap information for a plurality of websites; and analyzing the sitemap information to identify a website, in the plurality of websites. The website has sitemap information that is at least potentially out of date. The method also includes updating the sitemap information for the identified website by downloading updated sitemap information for the identified website; and scheduling documents for crawling in accordance with the updated sitemap information for the identified website.

DESCRIPTION OF EMBODIMENTS

A web server of a website generates a sitemap of URLs (Universal Resource Locators) or URIs (Universal Resource Identifiers) that may be crawled by a web crawler. The sitemap may also include metadata associated with the URLs and/or URIs included in the sitemaps. The web server sends a notification to a remote computer associated with a web crawler. In this context the web server may be considered to be the client and the web crawler is considered to be the server in a client-server relationship. The remote computer accesses the sitemap and uses the information included within the sitemap to identify documents stored at the web server to include in a crawl.

In context of search engines and network crawlers, the term "crawl" means to download and process documents so as to build an index or other listing of documents. "A crawl" is an iteration of a crawl process, during which a set of documents are downloaded and processed. The term "crawl" sometimes also means identifying and processing links in the downloaded documents so as to build a link map or other representation of links between the crawled documents. Typically, the purpose of a crawl is to compile the information in a set of documents for a search engine, thereby enabling the search engine to identify documents satisfying search queries.

Figure 1:
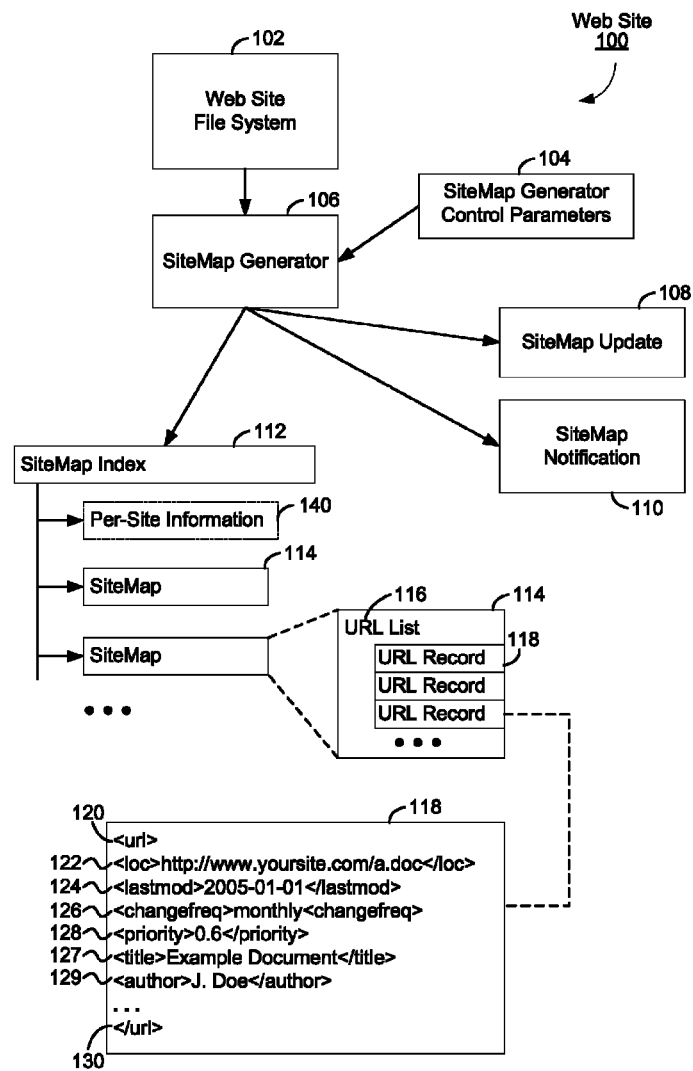
FIG. 1 is a conceptual diagram of a process for generating a sitemap for a website, according to some embodiments of the present disclosure.

FIG. 1 is a block diagram illustrating a website 100, according to some embodiments of the present disclosure. The website 100 includes a website file system 102, sitemap generator control parameters 104, a sitemap generator 106, a sitemap update module 108, a sitemap notification module 110, sitemaps 114, and sitemap indexes 112. The file system 102 may be implemented in some embodiments using any of a number of file systems, including distributed file systems in which files are stored on multiple computers. In other embodiments, the file system 102 may be implemented using a database or search engine that produces documents in response to queries. It should be appreciated, however, that FIG. 1 is intended more as functional description of the various features which may be present in a website than as a structural schematic of the embodiments described herein. In practice, and as recognized by those of ordinary skill in the art, items shown separately could be combined and some items could be separated. For example, some items shown separately in FIG. 1 could be implemented on single servers and single items could be implemented by one or more servers. As recognized by those of ordinary skill in the art, a website may be implemented on a single server, such as a web server, or on a plurality of servers, such as a plurality of web servers. The actual number of servers used to implement a website server and how features are allocated among them will vary from one implementation to another, and may depend in part on the amount of data traffic that the system must handle during peak usage periods as well as during average usage periods. For convenience of explanation, websites will be described below as if they are implemented on a single web server.

The website file system 102 organizes the documents that are stored at the web server. A document stored at the website may be any machine-readable file that includes text, graphics, video, audio, etc., or any combination thereof. Examples of documents that may be stored at a website include, without limitation, web pages, images, video files, audio files, Portable Document Format (PDF) files, plain text files, executable files, presentation files, spreadsheets, word processor documents, and so forth.

The documents stored at the website 100 may be organized in a hierarchal structure. That is, the documents are organized into a tree of nested directories, folders, or paths (hereinafter the "directory tree"). The directory tree includes a root directory/folder/path, and the root may have subdirectories/subfolders/subpaths nested within. The subdirectories/sub-folders/subpaths may also have further subdirectories/subfolders/subpaths nested within, thus forming a directory tree. Each document is stored in a directory/folder/path in the directory tree. Each directory/folder/path and each document is a node in the tree. The file system also stores metadata associated with the documents, such as a last modification date, a last access date, document permissions, and the like. In some embodiments, the file system may also include a database of documents and associated metadata. Documents in the database may be accessed by executing a query of the database as well as, or instead of, traversing the directory tree.

Each document stored at the website may be identified and/or located by a locator. In some embodiments, the locator is the Uniform Resource Locator (URL) of the document. In some other documents, alternative manners of identification (e.g., URIs) or addressing may be used. The URL of a document may be derived from its location in the file system. The URL of a document may be based on the directory/folder/path, or the location in a database, or on the query used to retrieve the document from the database in which the document is stored. That is, each document in a directory/folder/path or a database location may be mapped to an URL. In some embodiments, the URLs may be used by computers external to the website, such as remote computers associated with web crawlers, to access the documents in the file system that are open to external access. For convenience of explanation, the document locators are described below as if they are URLs.

The sitemap generator 106 generates sitemaps and, optionally, one or more sitemap indexes of the website. The sitemaps, further details of which are described below, may be used by web crawlers to schedule its crawls of documents stored at the web server. Sitemap indexes, further details of which are described below, encapsulate one or more sitemaps. The sitemap index may contain a list of sitemaps. The sitemap generator 106 generates sitemaps by accessing one or more sources of document information. In some embodiments, the sources of document information include the file system 102, access logs, pre-made URL lists, and content management systems. The sitemap generator may gather document information by simply accessing the website file system 102 and collecting information about any document found in the file system 102. For instance, the document information may be obtained from a directory structure that identifies all the files in the file system. The sitemap generator 106 may also gather document information by accessing the access logs (not shown) of the website. The access logs record accesses of documents by external computers. An access log may include the URLs of the accessed documents, identifiers of the computers accessing the documents, and the dates and times of the accesses. The sitemap generator 106 may also gather document information by accessing pre-made URL lists (not shown). The pre-made URL lists list URLs of documents that the website operator wishes to be crawled by web crawlers. The URL lists may be made by the website operator using the same format as that used for sitemaps, as described below.

If the documents in the website are managed via a content management system, the sitemap generator 106 may gather document information by interfacing with the content management system and accessing the information stored within the content management system. Content management systems are well known in the art and need not be further described.

The sitemap generator control parameters 104 include predefined parameters that control the generation of sitemaps. Further information regarding the sitemap generator control parameters 104 is described below, in relation to FIG. 3.

The sitemap generator 106 generates sitemaps 114 and possibly one or more sitemap indexes 112. The sitemap 114 and sitemap index 112 may be generated using any suitable format and language. In some embodiments, the sitemap is generated in Extensible Markup Language (XML) format, using predefined XML tags. In some other embodiments, other formats may be used, including but not limited to plain text files, comma-separated value files, and semicolon-separated value files. For convenience of description, sitemaps and sitemap indexes below are described as formatted using XML.

A sitemap index 112 is a document that lists one or more sitemaps 114. The sitemap generator 106, when generating sitemaps for the website, may generate multiple sitemaps, with each sitemap listing a subset of URLs of documents that may be crawled, rather than listing URLs of all documents that may be crawled in one sitemap. In such a situation, the sitemap generator 106 may also generate a sitemap index 112 to list the multiple sitemaps and their URLs. A sitemap index may include starting and ending tags (e.g., XML tags such as <sitemapindex> and </sitemapindex>, not shown in the Figures) defining the beginning and end of the sitemap index 112. The sitemap index also includes URLs of each sitemap listed in the sitemap index. The sitemap index may also include optional metadata for respective sitemap URLs in the sitemap index. For instance, the metadata may include a last modification date of the respective sitemap. Each sitemap URL and any respective associated metadata are enclosed by starting and ending tags that define the beginning and end of a sitemap record 114 in the sitemap index 112.

In addition to the list of sitemaps, in some embodiments a sitemap index may optionally contain a list of site-specific information 140 (also called "per-site information") that applies to an entire website. For example, a sitemap index may contain a list of time intervals and a rate at which the crawler should crawl the respective website (e.g., <crawl_rate from=08:00 UTC to =17:00 UTC>medium</crawl_rate>

<crawl_rate from=17:00 UTC to =8:00 UTC>fast</crawl_rate>).

In other examples, a sitemap index contains geographic information identifying a geographic location associated with the website (e.g., <location>latitude, longitude</location>), and/or it may contain language information identifying one or more languages supported by or otherwise associated with the respective website (e.g., <language>German</language>). In some embodiments, per-site information may also be present in the sitemaps references in a sitemap index file. If both the sitemap index and a referenced sitemap contain per-site information for the same property (e.g., crawl rate), then the value specified in the sitemap overrides the value specified in the sitemap index. In other embodiments, per-site information may be specified in a sitemap index or sitemap using syntax other than the examples given here.

In one embodiment, the sitemap generator 106 of a website generates a new sitemap at regular intervals, such as daily or weekly. Each new sitemap generated, after a first (starting point) sitemap, only lists URLs that are new or modified since the prior sitemap was generated (i.e., have a creation date or modification date after the date that the last sitemap was generated). The term "date" is used here to mean date and time, and may be represented by a timestamp, such as an ISO 8601 compatible timestamp using UTC (coordinated universal time). In these embodiments, the sitemap index for the website lists all the sitemaps generated for the website. Optionally, a new starting point sitemap may be generated by the sitemap generator at larger intervals (e.g., weekly or monthly) than the intervals at which the update sitemaps are generated. Each time a new sitemap is generated and added to the sitemap index, a notification is sent to one or more search engines or crawlers.

A sitemap 114 is a document that lists the URLs of documents in a website that may be crawled by a web crawler. A sitemap 114 includes a list of URLs and, optionally, additional information, such as metadata, for respective listed URLs. A sitemap 114 may include starting and ending tags 116 that define the beginning and end of the sitemap. The sitemap includes one or more URL records 118. The beginning and end of each URL record 118 are defined by a starting tag 120 and an ending tag 130. Each URL record 118 includes the URL 122 of a document that may be crawled. A URL record 118 may also include optional metadata associated with the respective URL. The optional metadata may include one or more of the following: a last modification date 124 of the document specified by the URL, a change frequency 126 (also called the update rate) of the document specified by the URL, a document title 127, a document author 129, and a priority 128 of the document specified by the URL. The change frequency 126 and priority 128 may be specified by the website operator.

The change frequency 126 is a descriptor of how often a document's content is expected to change. The descriptor is one of a predefined set of valid descriptors. In some embodiments, the set of change frequency descriptors includes "always," "hourly," "daily," "weekly," "monthly," "yearly," and "never." The change frequency 126 provides a hint to the crawler as to how often the document changes and the crawler can use the hint to schedule crawls of the document accordingly. A crawler, however, may crawl the document in a way that is inconsistent with the specified change frequency. For example, a crawler may crawl a document marked as "hourly" less frequently than a document marked as "yearly." The actual crawl frequency of a document may be based on the document's importance (as represented by a score, such as PageRank), actual observed changes in the document (or lack thereof) as observed by the crawler, and other factors, as well as the change frequency specified in a sitemap.

The priority 128 is a value that specifies the relative priority of the document identified by the URL 122. The priority 128 may be the priority relative to other documents listed in the same sitemap 114, relative to other documents stored in the same web server as the document, or relative to all documents in the website. In some embodiments, the range of priority values is 0.0 to 1.0, inclusive, with 0.5 as the default value, 0.0 as the lowest relative priority, and 1.0 as the highest relative priority. In some other embodiments, other priority scales, such as 0 to 10, may be used. The priority may be used by a crawler to determine which documents in the website should be crawled first. The crawler may ignore or modify the priority values in a sitemap when those priority values fail to meet predefined criteria (e.g., a requirement that the priority values in a sitemap or set of sitemaps for a website have a predefined average value, such as 0.5). In some embodiments, the priority may also be used when indexing documents.

The sitemap generator 106 may also interact with a sitemap update module 108 and a sitemap notification module 110. The sitemap notification module 110 sends a notification to a remote computer associated with a web crawler whenever a new or updated sitemap is available at the website. The notification includes the URL of the sitemap, so that the remote computer can access the sitemap. If the website uses sitemap indexes, the notification, in some embodiments, includes just the URL of the sitemap index. The remote computer accesses the sitemap index and identifies the URLs of the sitemaps from the sitemap index. In some other embodiments, the notification may include the actual sitemap index, in which case the remote computer need not access the sitemap index at the website.

The sitemap update module 108 may generate a differential sitemap based on a difference between a previously generated sitemap and a current sitemap. Further information regarding differential sitemaps is described below, in relation to FIG. 6.

Figure 2:
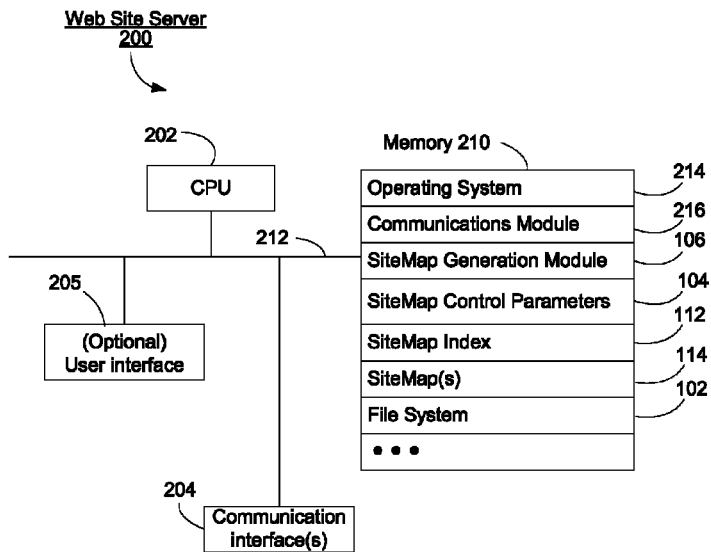
FIG. 2 is a block diagram illustrating a website server, according to some embodiments of the present disclosure.

FIG. 2 is a block diagram illustrating a website server 200, according to some embodiments of the present disclosure. The website server 200 (or "web server") typically includes one or more processing units (CPU's) 202, one or more network or other communications interfaces 204, memory 210, and one or more communication buses or signal lines 212 for interconnecting these components. The website server 200 optionally may include a user interface 205, which may comprise a display device, mouse, and/or a keyboard. The memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202 (e.g., network attached storage). Memory 210, or alternately the non-volatile memory device(s) within memory 210, comprises a non-transitory computer readable storage medium. In some embodiments, the memory 210 stores the following programs, modules and data structures, or a subset thereof:

- an operating system 214 that includes procedures for handling various basic system services and for performing hardware dependent tasks;
- a network communication module 216 that is used for connecting the website server 200 to other computers via the one or more communication network interfaces 204 and one or more communication networks, such as the Internet, other wide area networks, local area networks, metropolitan area networks, and so on;
- a sitemap generation module 106 that generates sitemaps;
- sitemap control parameters 104 that control or guide sitemap generation;
- a sitemap index 112 that lists URLs of sitemaps stored at the website server 200;
- one or more sitemap(s) 114 that list URLs of documents that may be crawled; and
- a website file system 102 that stores and organizes documents.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 2 shows a "website server," FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a website server and how features are allocated among them will vary from one implementation to another, and may depend in part on the amount of data traffic that the system must handle during peak usage periods as well as during average usage periods.

Figure 3:
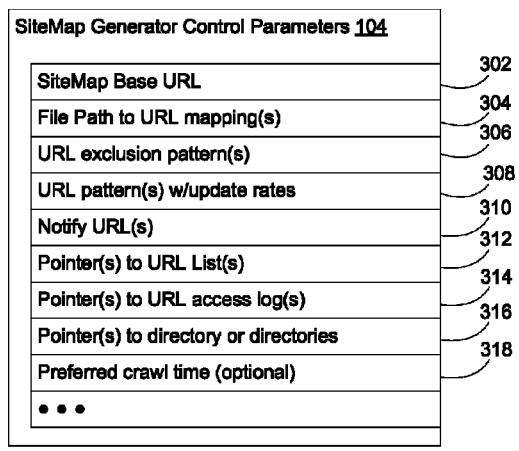
FIG. 3 is a block diagram illustrating a data structure for storing sitemap generator control parameters, according to some embodiments of the present disclosure.

FIG. 3 is a block diagram illustrating a data structure for storing sitemap generator control parameters, according to some embodiments of the present disclosure. The sitemap generator control parameters 104 control the generation of sitemaps and sitemap indexes. Each of the parameters may be specified by the operator of the website. The parameters may include one or more of the following:

- one or more sitemap base URLs 302, which specifies the location(s) from which the sitemaps may be accessed by remote computers associated with web crawlers;
- file path to URL mapping(s) 304, which map directories/paths/folders or database locations in the file system 102 to externally accessible URLs (an exemplary path to URL mapping is P:/A/B/*.*>www.website.com/qu/*.*);
- URL exclusion pattern(s) 306, which specify classes of URLs that are to be excluded from inclusion in sitemaps (e.g., an exclusion pattern of "www.website.com/wa/*.pr1" would indicate that all "pr1" files in the "/wa" portion of www.website.com are to be excluded from the sitemap(s));
- URL pattern(s) with update rates 308, which specify classes of URLs and update rates (change frequencies) for respective URL classes (e.g., www.website.com/qu/a*.pdf>daily would indicate that the files meeting the specified patterns are expected to be updated daily.
- notify URL(s) 310, which specify the URLs of remote computers associated with web crawlers to which new sitemap notifications may be transmitted;
- pointer(s) to URL list(s) 312, which point to pre-made URL lists;
- pointer(s) to URL access log(s) 314, which point to URL access logs;
- pointer(s) to directory or directories 316, which point to directories/folders/paths or database locations in the file system 102; and
- (optional) preferred crawl time(s) 318, which specifies preferred times of the day for web crawlers to crawl the website.

It should be appreciated that the parameters listed above are merely exemplary and that additional and/or alternative parameters may be included.

Figure 4:
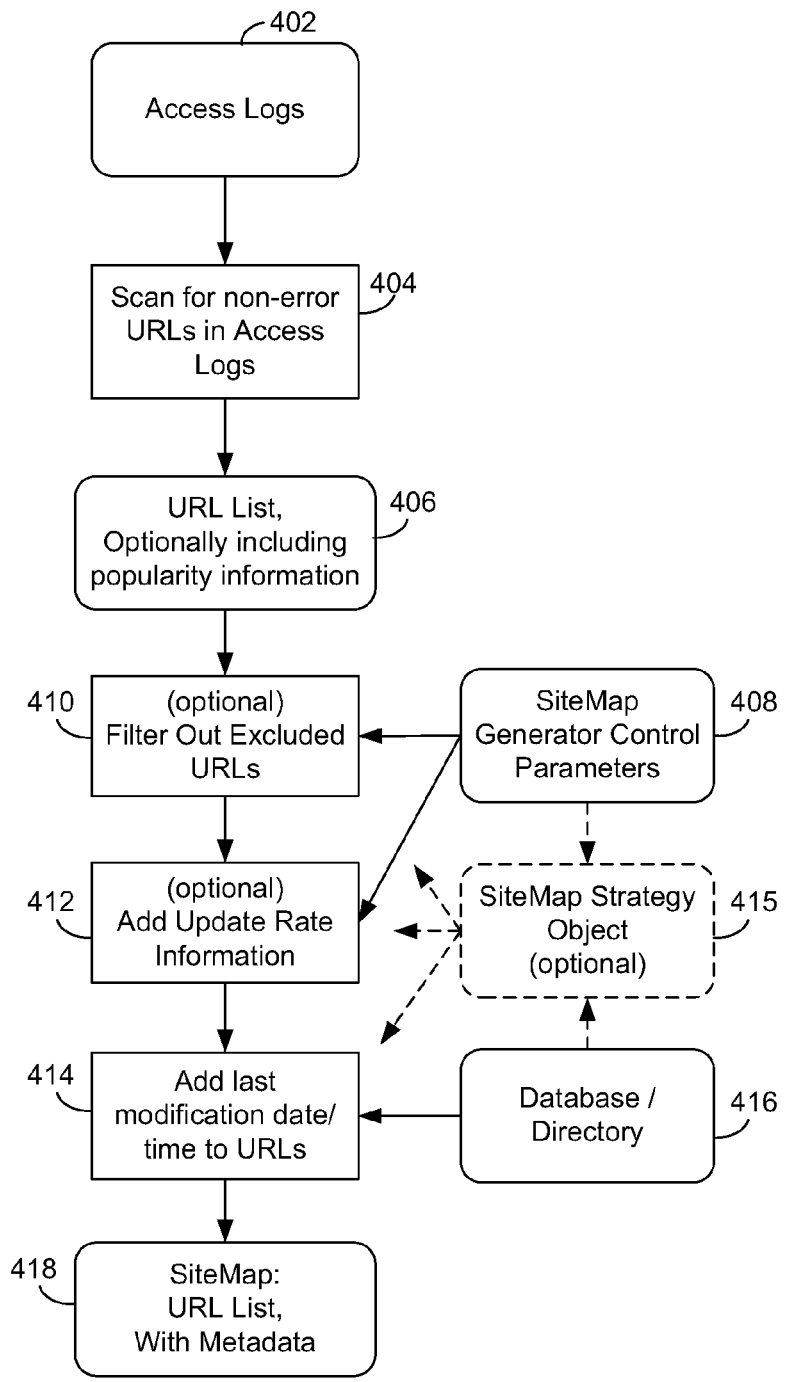
FIG. 4 is a flow chart illustrating a process for generating a sitemap, according to some embodiments of the present disclosure.

FIG. 4 is a flow chart illustrating a process for generating a sitemap, according to some embodiments of the present disclosure. As described above, a source of information about documents stored on the website is the access logs of the website. The access logs of the website are accessed (402). The access logs may be found by following pointers 314 to URL access logs. The access logs are scanned for non-error URLs (404). Non-error URLs are URLs that properly specify an existing and accessible document. Thus, for example, a URL for a document that is no longer on the website may be deemed an error URL. A list of URLs is generated (406). The list includes the non-error URLs found in the access logs. The list optionally may also include document popularity information derived from the access logs. The document popularity information may be determined based on the numbers of accesses each non-error URL has. The document popularity information serves as an additional hint of which documents are to be given a higher priority during crawling (e.g., scheduled to be crawled first, or more likely to be crawled than lower priority documents), based on which documents are in high demand (i.e., are accessed more often).

After the list of URLs is generated, the list may optionally be filtered for excluded URLs (410). The URL exclusion patterns 406 from the sitemap generator control parameters 104 may be used as the filter that is applied to the list of URLs (408). Alternately, URL exclusion patterns may be obtained elsewhere, or permanently encoded in a customized sitemap generator for the website. URLs in the list that match any of the URL exclusion patterns are removed from the list.

Optional update rate information may be added to the list of URLs, for the respective URLs in the list (412). In some embodiments, the update rates may be obtained from the sitemap generator control parameters 104, or more particularly, the URL pattern(s) with update rates 308 (408).

Last modification dates and times for the respective URLs in the list of URLs are added (414). The last modification dates may be obtained from the file system, which may be a database and/or a directory tree 416, as described above.

In an alternate embodiment, a sitemap strategy object 415 controls the filtering operation 410, update rate information adding operation 412 and the last modification date adding operation 414, using information obtained from a database 416 and/or the sitemap generator control parameters 408. In some embodiments, the sitemap strategy object determines which URLs (or URIs) to filter and which attributes to add to specific URLs (or URIs) by performing a database query on the underlying database 416.

The sitemap is generated from the resulting list of URLs, including any last modification date/time information, optional popularity information, and optional update rate information that has been included or obtained for the listed URLs (418). Within the sitemap, the metadata for the URLs listed in the sitemap comprises the last modification date/time information, optional popularity information, and optional update rate.

Figure 5:
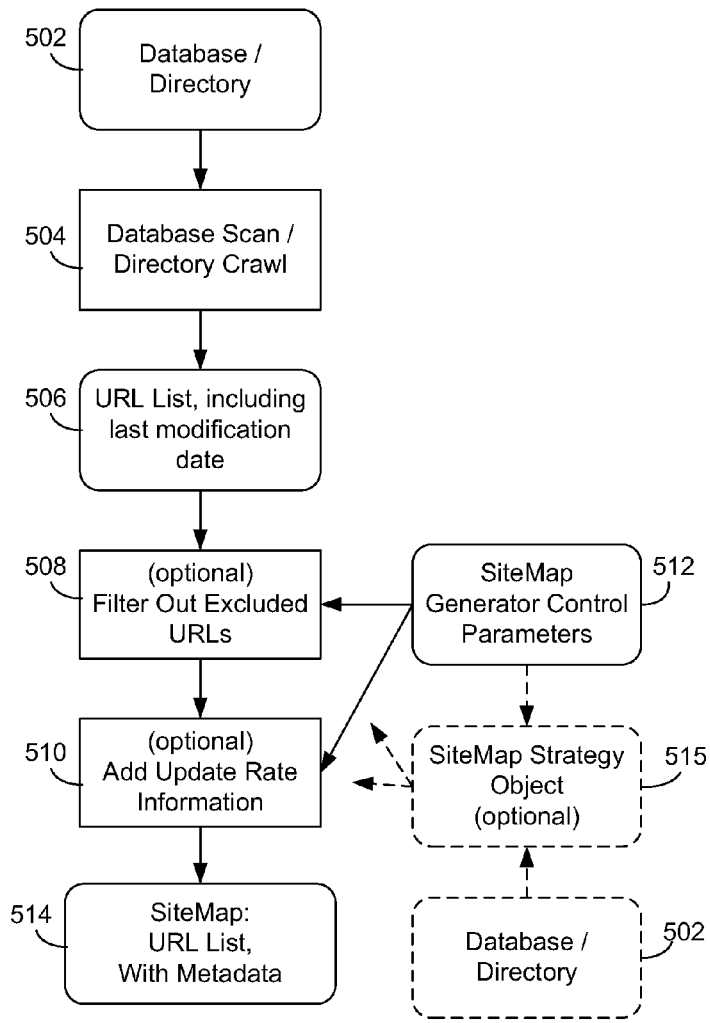
FIG. 5 is a flow chart illustrating another process for generating a sitemap, according to some embodiments of the present disclosure.

FIG. 5 is a flow chart illustrating another process for generating a sitemap, according to some embodiments of the present disclosure. The process of FIG. 5 is similar to that of FIG. 4, with the difference being that, in the process of FIG. 5, the initial source of document information is the file system database or directory tree (502), rather than access logs. A scan of the database or a traversal of the directory tree is performed (504). From the database scan or directory tree traversal, a list of URLs and associated last modification dates are obtained (506). The list may be optionally filtered for excluded URLs (508), using the URL exclusion patterns from the sitemap generator control parameters as the filters (512). Optionally, additional metadata, such as document update rate information associated with the respective URLs in the list of URLs may be added (510). The update rate information may be taken from the sitemap generator control parameters (512). The sitemap is generated from the list of non-excluded URLs, the last modification date information, and additional information such as the update rate information.

In an alternate embodiment, a sitemap strategy object 515 controls the filtering operation 508 and/or adding metadata 510 to the list of URLs or URIs in the sitemap 514 using information obtained from the underlying database 502 and/or the sitemap generator control parameters 512. In some embodiments, the sitemap strategy object 515 determines which URLs (or URIs) to filter and which attributes to add to specific URLs (or URIs) by performing a database query on the underlying database 502.

It should be appreciated that the sitemap generation processes illustrated in FIGS. 4 and 5 may be adapted to use alternative sources of document information and/or use multiple sources of document information. For example, the sitemap generator may initially extract URLs from one or more pre-made URL lists or from a content management system associated with the website. Regardless of the source from which the URLs are extracted, the sitemap generator may collect document metadata from as many of the sources of document information as needed. For example, the sitemap generator may extract URLs from pre-made URL lists, obtain the last modification dates from the file system and obtain document popularity information from the access logs. Any suitable combination of sources of document information may be used to generate the sitemaps.

Figure 6:
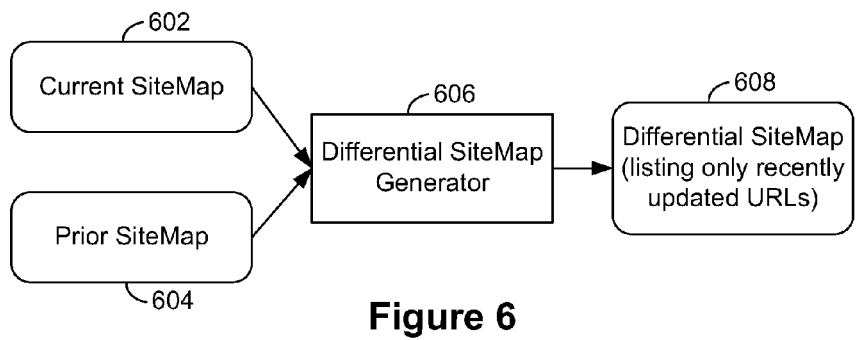
FIG. 6 is a flowchart illustrating a process for generating a differential sitemap, according to some embodiments of the present disclosure.

FIG. 6 is a flowchart illustrating a process for generating a differential sitemap, according to some embodiments of the present disclosure. A differential sitemap is a sitemap that is generated based on a difference between a previously generated sitemap and a current sitemap. The differential sitemap includes URLs that were not included in the previously generated sitemap and URLs that were included in the previously generated sitemap but which have new or updated metadata. For example, a URL with an updated last modification date would be included in the differential sitemap. The presence of an updated last modification date for the URL means that the document at the respective URL has been updated since the previously generated sitemap.

A current sitemap (602) and a previously generated sitemap (604) are processed by a differential sitemap generator, such as the sitemap update module 108 (606). The differences between the two sitemaps are ascertained and a differential sitemap is generated (608).

The sitemaps, if used by web crawlers, may lead to greater crawl coverage, since the sitemaps may include documents, such as documents that are accessible only by a database query, that are not accessible by following links. The sitemaps may also provide last modification dates. Web crawlers may use the last modification dates to determine if a document has changed, and may thereby avoid crawling documents whose contents have not changed. The use of sitemaps to avoid crawling unchanged documents can make web crawlers and network crawlers significantly more efficient. The sitemaps also include information from which web crawlers may determine which documents to crawl first and how much load to put on the web server during crawling. This, too, may help conserve network resources.

Web Crawler, SiteMap Crawler, and Scheduler Systems

Figure 7:
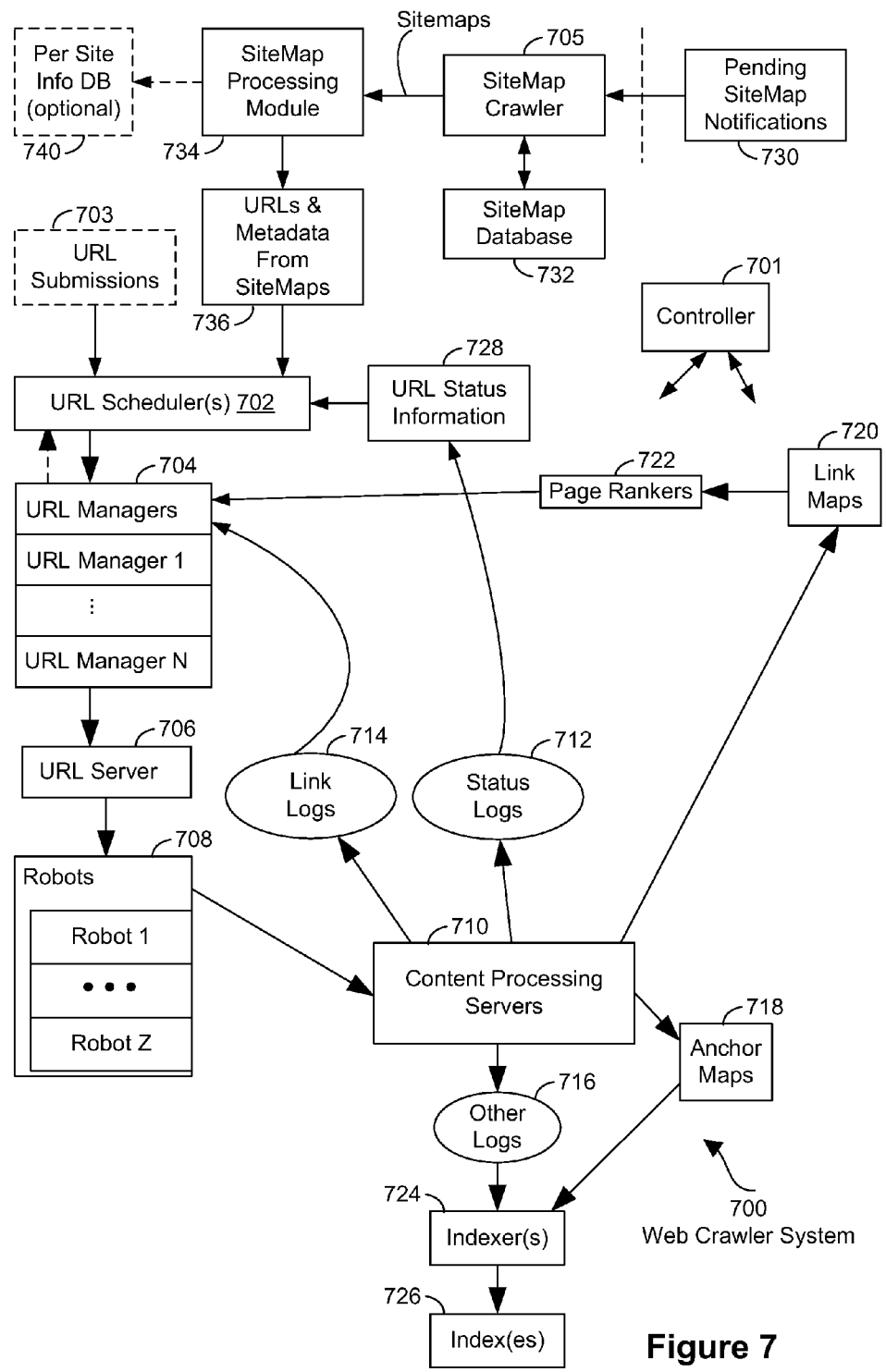
FIG. 7 is a block diagram illustrating a web crawler system, according to some embodiments of the present disclosure.

FIG. 7 is a block diagram illustrating a web crawler system 700, according to some embodiments of the present disclosure. The web crawler system 700, which may be a part of and/or associated with a search engine, crawls locations corresponding to documents stored in web servers. As discussed above, a document stored at the website may be any machine-readable file that includes text, graphics, video, audio, etc., or any combination thereof.

The sitemap crawler 705 accesses sitemaps generated by websites or web servers. The sitemap crawler 705 receives sitemap notifications. The sitemap notifications 730 are received from web servers or websites that have documents available for crawling. A notification from a web server or website informs the sitemap crawler that one or more sitemaps listing URLs of documents that may be crawled are available for access. The notification may include the URL of a sitemap, or the URLs of two or more sitemaps. The notification may include the URL of a sitemap index, or it may include the content of a sitemap index. In some embodiments, the notification may include the sitemap index (112, FIG. 1) or the full sitemap. The sitemap crawler 705 may access the sitemap index at the sitemap index URL to learn the URLs of the sitemaps and then access the sitemaps.

The sitemap crawler 705 accesses sitemaps from web servers or websites and may store copies of the accessed sitemaps in a sitemap database 732. The sitemap database 732 stores the sitemaps and information associated with the sitemaps, such as the web servers and/or websites with which the sitemaps are associated, the last modification dates of the sitemaps, and update rate information associated with the sitemaps.

Accessed sitemaps are provided to a sitemap processing module 734 for processing. The sitemap processing module 734 processes the sitemaps and identifies the URLs and associated metadata 736. The sitemaps are a source of URLs and associated metadata information for the URL scheduler 702. In some embodiments, an optional, additional source of URLs and associated metadata is direct submission 703 by users.

The URL scheduler 702 determines which URLs will be crawled in each crawling session. The URL scheduler 702 may store that information in one or more data structures (not shown), such as a set of list data structures. In some embodiments, the URL scheduler 702 allocates URLs to segments of the data structure, where the segments correspond to the crawl sessions. In these embodiments, the URL scheduler 702 also determines which URLs within each segment are to be crawled. In some embodiments, there may be a number of URL schedulers 702, which are run prior to each segment being crawled. Each scheduler 702 is coupled to a corresponding URL manager 704, which is responsible for managing the distribution of URLs to URL server 706. Alternately, each URL scheduler 702 may be coupled to two or more of the URL managers, enabling the URL distribution function for each crawl session to be spread over multiple URL managers. The URL schedulers 702 are adapted to receive URLs and metadata 736 extracted from sitemaps.

A controller 701 selects a segment for crawling. The selected segment is referred to hereinafter as the "active segment." Typically, at the start of each session, the controller 701 selects a different segment as the active segment so that, over the course of several sessions, all the segments are selected for crawling in a round-robin manner.

A query-independent score (also called a document score) is computed for each URL by URL page rankers 722. The page rankers 722 compute a page importance score for a given URL. In some embodiments, the page importance score is computed by considering not only the number of URLs that reference a given URL but also the page importance score of such referencing URLs. Page importance score data is provided to URL managers 704, which pass a page importance score for each URL to URL server 706, robots 708, and content processing servers 710. One example of a page importance score is PageRank, which is used the page importance metric used in the Google search engine. An explanation of the computation of PageRank is found in U.S. Pat. No. 6,285,999, which is incorporated by reference herein in its entirety as background information. In some embodiments, information from the sitemaps may be incorporated into the computation of the page importance score. An example of sitemap information that may be incorporated into the page importance score is the priority 128.

From time to time, the URL server 706 requests URLs from the URL managers 704. In response, the URL managers 704 provide the URL server 706 with URLs obtained from the data structure. The URL server 706 then distributes URLs from the URL managers 704 to crawlers 708 (hereinafter also called "robots" or "bots") to be crawled. A robot 708 is a server that retrieves documents at the URLs provided by the URL server 706. The robots 708 use various known protocols to download pages associated with URLs (e.g., HTTP, HTTPS, Gopher, FTP, etc.). In some embodiments, a robot 708 retrieves from the per-site information database 740 crawl rate and/or crawl interval information for a specified website, and then uses the retrieved information to control the rate at which URLs or URIs are fetched by the robot 708 from the website.

Pages obtained from URLs that have been crawled by robots 708 are delivered to content processing servers 710, which perform a number of tasks. In some embodiments, these tasks include indexing the content of the pages, generating records of the outbound links in the pages, detecting duplicate pages, and creating various log records to record information about the crawled pages. In one embodiment, these log records are stored in log files, including link logs 714, status logs 712, and other logs 716. The link logs 714 include a link record for each document obtained from a URL by a robot 708 and passed to the content processing servers 710. Each link log 714 record identifies all the links (e.g., URLs, also called outbound links) that are found in the document associated with the record and the text that surrounds the link. The information in the link logs 714 is used by the content processing servers 710 to create link maps 720. The records in the link map 720 are similar to records in the link logs 714 with the exception that text is stripped and the records are keyed by a "fingerprint" of the normalized value of the source URL. In some embodiments, a URL fingerprint is a 64-bit integer determined by applying a hash function or other one way function to a URL. The bit-length of the URL fingerprint may be longer or shorter than 64 bits in other embodiments. The records in each link map 720 may optionally be sorted or keyed by a fingerprint. The link maps 720 are used by the page rankers 722 to compute or adjust the page importance score of URLs. In some embodiments, such page importance scores may persist between sessions.

The status logs 712 log the status of the document processing performed by the content processing servers 710. The status logs may include URL status information 728 (e.g., whether a document existed at the specified URL, last modification date information, and update rate information). The URL status information may be transmitted to the URL scheduler(s) 702. The URL scheduler(s) may use the URL status information to schedule documents for crawling.

In some embodiments, the content processing servers 710 also create anchor maps 718. The anchor maps 718 maps the "anchor text" in hyperlinks to the URL of the target URLs of the hyperlinks. In documents that use HTML tags to implement the hyperlinks, the anchor text is the text located between a pair of anchor tags. For example, the anchor text in the following pair of anchor tags is "Picture of Mount Everest":

<A href="http://www.website.com/wa/me.jpg">Picture of Mount Everest</A>.

In some embodiments, sitemap-supplied document metadata may also be used for creating anchor maps. For example, document metadata such as the document title 127 (FIG. 1), document author 129, or document description (not shown) may be used to create the anchor maps. However, it should be appreciated that any field appearing in a sitemap may be included in an anchor map.

In some embodiments, the records in an anchor map 718 are keyed by the fingerprints of outbound URLs present in link log 714. Thus, each record in an anchor map 718 comprises the fingerprint of an outbound URL and the anchor text that corresponds to the URL in link log 714. Anchor maps 718 are used by the indexer(s) 724 to facilitate the indexing of "anchor text" as well as to facilitate the indexing of URLs that do not contain words. For example, consider the case in which the target document at an outbound URL (e.g., the URL in the above example) is a picture of Mount Everest and there are no words in the target document. However, anchor text associated with the URL, "Picture of Mount Everest" is included in an index 726, thereby making the target document accessible via a search engine using the index 726.

The anchor maps 718 and other logs 716 are transmitted to indexer(s) 724. The indexer(s) 724 use the anchor maps 718 and other logs 716 to generate index(es) 726. The index(es) are used by the search engine to identify documents matching queries entered by users of the search engine.

Figure 8:
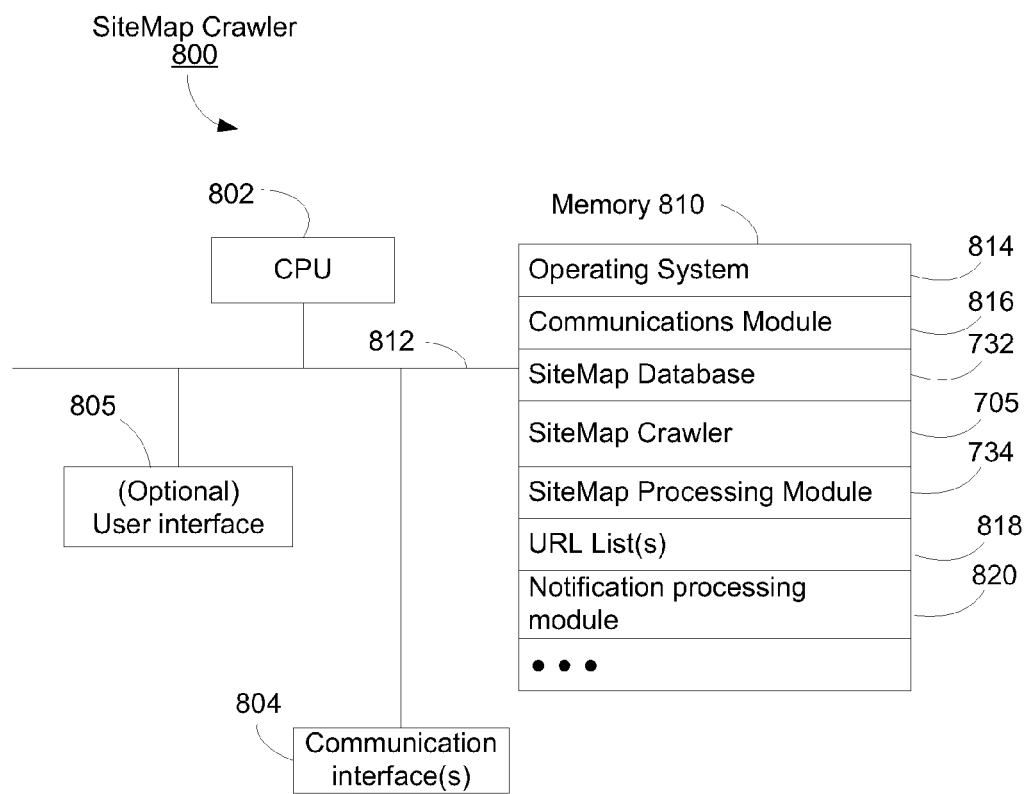
FIG. 8 is a block diagram illustrating a sitemap crawler, according to some embodiments of the present disclosure.

FIG. 8 is a block diagram illustrating a sitemap crawler system 800, according to some embodiments of the present disclosure. The sitemap crawler system 800 typically includes one or more processing units (CPU's) 802, one or more network or other communications interfaces 804, memory 810, and one or more communication buses or signal lines 812 for interconnecting these components. The sitemap crawler system 800 optionally may include a user interface 805, which may comprise a keyboard, mouse, and/or a display device. The memory 810 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 810 may optionally include one or more storage devices remotely located from the CPU(s) 802. In some embodiments, memory 810 stores the following programs, modules and data structures, or a subset thereof:

- an operating system 814 that includes procedures for handling various basic system services and for performing hardware dependent tasks;
- a network communication module 816 that is used for connecting the sitemap crawler system 800 to other computers via the one or more communication network interfaces 804 and one or more communication networks, such as the Internet, other wide area networks, local area networks, metropolitan area networks, and so on;
- a sitemap database 732 that stores accessed sitemaps;
- a sitemap crawler 705 that accesses sitemaps provided by web servers;
- a sitemap processing module 734 that receives sitemaps and processes the sitemaps to identify URLs and associated metadata;
- URL list(s) 818 that list URLs of documents that may be crawled; and
- a notification processing module 820 that processes new sitemap notifications received from web servers.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 810 may store a subset of the modules and data structures identified above. Furthermore, memory 810 may store additional modules and data structures not described above.

In embodiments in which one or more of the sitemap indexes or sitemaps contains per-site information, such per-site information is extracted and added to a per-site information database 740 (e.g., by the sitemap crawler 705). When appropriate information (e.g., language and/or location information) is available in the per-site information database 740, it is used by the indexers 724 to add per-site information (e.g., language and/or location information) to the indexes 726. The inclusion of website geography and/or language information in the indexes 726 allows searches to be performed by a search engine, using the indexes 726, that include geographic and/or language restrictions. For instance, when the indexes of a search engine include geographic information about at least some websites, the search engine can service requests such as "pizza within 1 mile of London Bridge, London, England". When the indexes of a search engine include language information about at least some websites, the search engine can service requests such as "German URLs containing 'George Bush'". In embodiments in which the per-site information includes crawl rate information and/or crawl time intervals, that information is used by the URL schedulers 702 and/or robots 708 to control the times and rates at which web pages are crawled.

Although FIG. 8 shows a "sitemap crawler system," FIG. 8 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers. The actual number of servers used to implement a sitemap crawler system and how features are allocated among them will vary from one implementation to another, and may depend in part on the amount of data traffic that the system must handle during peak usage periods as well as during average usage periods.

Figure 9:
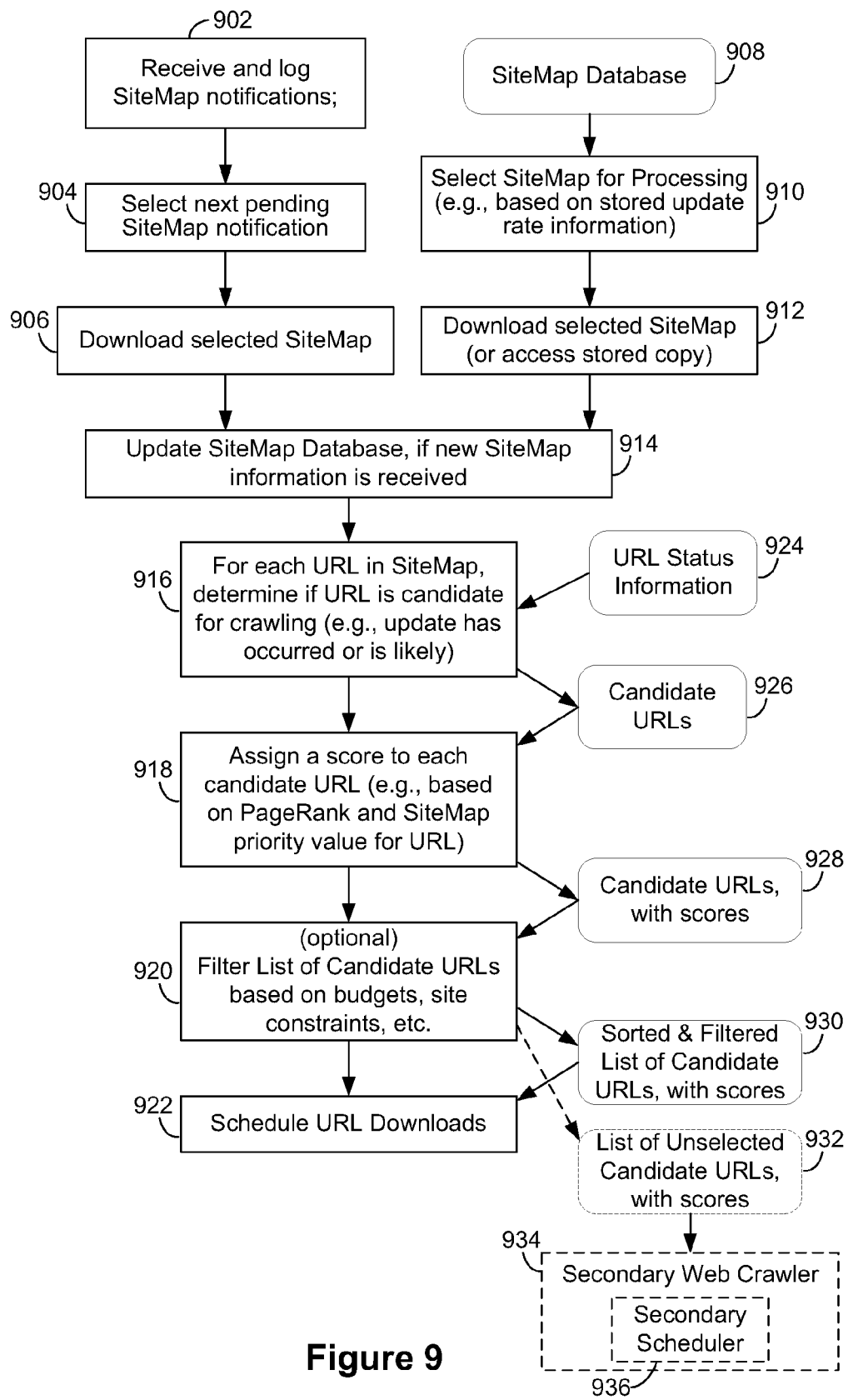
FIG. 9 is a flowchart illustrating a process for scheduling document downloads based on information included in a sitemap, according to some embodiments of the present disclosure.

FIG. 9 is a flowchart illustrating a process for scheduling document downloads based on information included in a sitemap, according to some embodiments of the present disclosure. In some embodiments, scheduling documents for downloading means generating a list of document identifiers that identify the scheduled documents. The list of documents identifiers may be an ordered list, with document identifiers earlier in the list having higher priority or importance that document identifiers lower in the list.

In some embodiments, the sitemap crawler may access a sitemap upon receipt of a notification that a current version of the sitemap is available. Sitemap notifications are received and logged (902). The next pending sitemap notification is selected (904). The sitemap(s) associated with the selected sitemap notification are downloaded from the web server (906).

In some other embodiments, the sitemap crawler may periodically select sitemaps for processing and access the sitemaps without waiting for notifications, in addition to or in lieu of waiting for sitemap notifications. The sitemap database is accessed (908). A sitemap from the database is selected for processing (910). The selection may be made based on information stored in the database, such as last modification date information or update rate information. For example, when the "age" of a sitemap (e.g., the current date minus the date of the sitemap, or the current date minus the date of last modification date in the sitemap), is older than the shortest predicted update period for any document listed in the sitemap, the sitemap may be selected for downloading. The selected sitemap is accessed, by download from the web server or by accessing the stored copy of the sitemap at the sitemap database (912).

The sitemap database is updated with new sitemap information if such information is received from the download (914). In embodiments in which one or more of the sitemap indexes or sitemaps contains per-site information, a per-site information database (740, FIG. 7) is updated with the received per-site information. For each URL in the sitemap, a determination as to whether the URL is a candidate for crawling is made (916). The determination may be made based on the URL status information, such as whether the document at the URL has been or is likely to have been updated, or whether the URL properly specifies an accessible document (924). URLs that are determined to be candidates for crawling are identified as candidate URLs (926) and each of them is assigned a score (918). The score for each candidate URL may be based on the page importance score (e.g., PageRank) of the URL and the priority value of the URL, which was extracted from the sitemap. After scoring, the candidate URLs (928) may be run through an optional filter. The filter may select a subset of the candidate URLs based on one or more predefine criteria, such as budgets, site constraints (e.g., limits on the number of documents that the crawler is allowed to download during the time period of the crawl), and so forth. The resulting list of candidate URLs is then used to schedule URL downloads (922). As noted above, scheduling URL downloads may comprise generating an ordered list of URLs or document identifiers, with document identifiers earlier in the list representing documents having higher priority or importance that documents placed later in the ordered list. Furthermore, as noted above, in some embodiments the scheduling operation 922 takes into account per-site information received in the sitemap indexes or sitemaps, such as crawl interval and/or crawl rate information for specific web sites.

In some embodiments, the scheduler may schedule more documents for crawling than the crawler can actually crawl. In some embodiments, a crawler may have a crawl budget for a website or web server. The budget is a maximum number of documents a crawler may crawl, in a particular crawl session, for the particular website or web server. In other words, the budget is a self-imposed limit, imposed by the web crawler, on how many documents to crawl for a particular web server or website. The budget limits the crawling a crawler will perform for a particular website or web server, ensuring that the crawler can crawl other websites or web servers before reaching its crawl limit.

In some embodiments, a website/web server operator may set site constraints to constrain crawling for a particular website or web server. The goal of the site constraints are to limit crawling for the particular website or web server, in order to prevent network resources associated with the website or web server from being depleted by the crawler. The site constraints may include a maximum number of documents, defined by the website operator, which may be crawled for the particular website during a define period of time (e.g., per hour or per day).

It should be appreciated, however, that the predefined criteria for filtering candidate URLs, as described above, are merely exemplary, and that additional or alternative criteria may be included.

The filtering of the candidate URLs leads to the generation of a list of sorted and filtered candidate URLs (930) and optionally a list of unselected candidate URLs 932. The list of sorted and filtered candidate URLs is transmitted to the scheduler, where the scheduler will schedule the crawls for the URLs in the list. Optionally, the list of unselected URLs 932 may be transmitted to a secondary web crawler 934, which may include a secondary scheduler 936. The secondary scheduler 936 schedules the URLs in the list 932 for crawling by the secondary web crawler 934.

The URL scheduler may schedule crawls for URLs in the list according to the document metadata obtained from the sitemaps. As described above, the metadata may include document last modification date information, document update rate information, document priority information, and document popularity information.

The scheduler may schedule crawls of URLs based on the last modification date information from the sitemaps. The scheduler may defer scheduling of a document corresponding to a URL for crawling if the document has not been modified since the last date/time the document was downloaded by the web crawler. In other words, the scheduler may defer scheduling of a document for crawling if the last modification date of the document is no later than the date/time of the last download of the document by the web crawler. Such deferral helps conserve network resources by avoiding re-downloading of documents that have not changed.

The scheduler may also schedule crawls of documents based on the update rate information form the sitemaps. The scheduler may schedule crawls of a document if a predefined function of the update rate and the last date/time at which the document was downloaded satisfy predefined criteria. In some embodiments, the document may be scheduled for downloading if the difference between the last date/time at which the document was downloaded and the current time is greater than the update rate as indicated by the update rate information. For example, if the update rate of a document is "weekly" and the last time the document was downloaded was two weeks ago, the scheduler may schedule the document for downloading. This helps conserve network resources by avoiding downloading of documents that is expected to be unchanged since the last download.

The scheduler may also adjust scores of candidate URLs based on their relative priorities. The scheduler determines boost factors corresponding to the relative priorities and applies them to the scores. In some embodiments, the scheduler may also determine boost factors based on document popularity information, the document popularity information being an additional indication of document priority.

In some embodiments, the scores included with the selected or unselected candidate URLs may be used to determine which URLs are must-crawl URLs. That is, whether a document is guaranteed to be crawled may be based on the score. URLs whose scores are high may be designated as must-crawl. This ensures that important pages are scheduled for crawling.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the present disclosure and its practical applications, to thereby enable others skilled in the art to best utilize the present disclosure and various embodiments with various modifications as are suited to the particular use contemplated.

What is claimed is:

1. A method of scheduling documents for crawling, performed on a computer system having one or more processors and memory storing one or more programs for execution by the one or more processors, the method comprising:
  obtaining sitemap information for a plurality of websites;
  analyzing the sitemap information to identify a website, in the plurality of websites, having sitemap information that is at least potentially out of date;
  updating the sitemap information for the identified website by downloading updated sitemap information for the identified website; and
  scheduling documents for crawling in accordance with the updated sitemap information for the identified website; wherein
  the sitemap information includes one or more sitemap indexes, wherein each sitemap index in the one or more sitemap indices includes a list of URLs corresponding to documents stored at a website in the plurality of websites, and
  each sitemap index in the one or more sitemap indexes includes information identifying one or more of: a last modification date of a URL in the list of URLs, a change frequency of a document specified by the URL, a title of the document, an authority of the document, and a priority of the document.

2. The method of claim 1, wherein a respective website in the plurality of websites includes one or more documents, and wherein the one or more documents are stored using a hierarchical structure.

3. The method of claim 2, wherein the hierarchical structure is a tree structure.

4. The method of claim 1, wherein the sitemap information includes one or more sitemaps, wherein each sitemap in the one or more sitemaps is generated using (i) an access log, (ii) a pre-made URL list, and (iii) information obtained from a content management system associated with the corresponding website.

5. The method of claim 4, wherein a sitemap in the one or more sitemaps is in a format selected from the group consisting of an XML file, a plain-text file, a comma-separated value file, and a semicolon-separated file.

6. The method of claim 1, wherein each sitemap index in the one or more sitemap indexes includes site-specific information for the website in the plurality of websites.

7. The method of claim 6, wherein the site-specific information includes one or more of: a list of crawl intervals, a crawl rate, and information identifying geographic location of the website.

8. The method of claim 1, wherein scheduling documents for crawling uses a document's change frequency.

9. The method of claim 1, wherein scheduling documents for crawling is independent of a document's change frequency.

10. The method of claim 1, wherein scheduling documents for crawling uses a document's priority.

11. The method of claim 1, wherein scheduling documents for crawling is independent of a document's priority.

12. The method of claim 1, wherein the steps recited in claim 1 are executed (i) in response to obtaining a notification of a change to the sitemap information or (ii) in accordance with a predefined schedule.

13. The method of claim 12, wherein the notification of a change to the sitemap information includes one or more of: information identifying a sitemap or a sitemap index, or a network location of the sitemap of the sitemap index.

14. The method of claim 1, further comprising: generating a sitemap for a website in the plurality of websites.

15. The method of claim 14, wherein generating the sitemap for the website includes:
    accessing an access log for the website, the access log having one or more URLs;
    applying one or more filters to the one or more URLs, thereby producing one or more filtered URLs; and
    generating the sitemap using the one or more filtered URLs.

16. The method of claim 15, wherein the access log includes an error URL and a non-error URL.

17. The method of claim 14, wherein generating the sitemap for the website includes:
    performing a database scan or a directory crawl to obtain one or more URLs associated with the website;
    applying one or more filters to the one or more URLs, thereby producing one or more filtered URLs; and
    generating the sitemap using the one or more filtered URLs.

18. The method of claim 1, wherein sitemap information includes a differential sitemap identifying, for a website in the plurality of websites, a difference between a first sitemap for the website and a second sitemap of the website.

19. The method of claim 18, wherein the first sitemap is a previous sitemap and the second sitemap is a current sitemap.

20. The method of claim 18, wherein the differential sitemap includes URLs included in the first sitemap but not included in the second sitemap.

21. The method of claim 18, wherein scheduling documents for crawling in accordance with the updated sitemap information uses the differential sitemap.

22. The method of claim 1, wherein the identified website includes a plurality of URLs, and scheduling documents for crawling in accordance with the updated sitemap information for the identified website includes scheduling a first URL in the plurality of URLs to be crawled during a first crawling session and scheduling a second URL in the plurality of URLs to be crawled during a second crawling session.

23. The method of claim 1, wherein the identified website includes a plurality of URLs, wherein the plurality of URLs is distributed into a plurality of URL segments, and scheduling documents for crawling in accordance with the updated sitemap information for the identified website includes, at each crawling session, selecting a URL from a different URL segment for crawl.

24. The method of claim 1, further comprising generating a sitemap for a website in the plurality of websites by a method comprising:
    obtaining one or more URLs associated with the website;
    indexing content of a webpage at a respective URL in the one or more URLs;
    generating records of out-bound links included in the web page;
    detecting duplicates pages;
    creating one or more log records for the web page; and
    generating the sitemap for the website using the one or more log records.

25. The method of claim 24, further comprising generating an anchor map for the website using anchor text included in a respective URL in the one or more URLs.

26. The method of claim 25, wherein the anchor map includes records keyed by a fingerprint of an out-bound link included in the webpage.

27. The method of claim 25, further comprising generating search indices for the website, using the anchor map.

28. The method of claim 1, wherein the sitemap information includes one or more sitemaps; and further comprising: selecting a sitemap in the one or more sitemaps for crawling in accordance with one of: a last modification date associated with the sitemap and an update rate associated with the sitemap.

29. The method of claim 1, wherein scheduling documents for crawling in accordance with the updated sitemap information for the identified website includes:
    obtaining a sitemap for the website, the sitemap having a plurality of URLs;
    selecting one or more candidate URLs from the plurality of URLs;
    assigning a score to each candidate URL in the one or more candidate URLs;
    applying one or more filtering criteria to each candidate URL; and
    scheduling for crawling filtered candidate URLs by a first crawler.

30. The method of claim 29, further comprising distributing a filtered candidate URL or a non-candidate URL in the plurality of URLs, to a second crawler distinct from the first crawler.

31. The method of claim 29, wherein the one or more filtering criteria include: a crawling budget for the first crawler and one or more site constraints for the identified website.

32. A computer system comprising:
one or more processors;
a memory storing one or more programs for execution by the one or more processors, wherein the one or more programs comprising instructions for:
obtaining sitemap information for a plurality of websites;
analyzing the sitemap information to identify a website, in the plurality of websites, having sitemap information that is at least potentially out of date;
updating the sitemap information for the identified website by downloading updated sitemap information for the identified website; and
scheduling documents for crawling in accordance with the updated sitemap information for the identified website;
wherein the sitemap information includes one or more sitemap indexes, wherein each sitemap index in the one or more sitemap indices includes a list of URLs corresponding to documents stored at a website in the plurality of websites, and
each sitemap index in the one or more sitemap indexes includes information identifying one or more of: a last modification date of a URL in the list of URLs, a change frequency of a document specified by the URL, a title of the document, an authority of the document, and a priority of the document.

33. A non-transitory computer readable storage medium storing one or more programs to be executed by a computer system, the one or more programs comprising instructions for:
obtaining sitemap information for a plurality of websites;
analyzing the sitemap information to identify a website, in the plurality of websites, having sitemap information that is at least potentially out of date;
updating the sitemap information for the identified website by downloading updated sitemap information for the identified website; and
scheduling documents for crawling in accordance with the updated sitemap information for the identified website;
wherein the sitemap information includes one or more sitemap indexes, wherein each sitemap index in the one or more sitemap indices includes a list of URLs corresponding to documents stored at a website in the plurality of websites, and
each sitemap index in the one or more sitemap indexes includes information identifying one or more of: a last modification date of a URL in the list of URLs, a change frequency of a document specified by the URL, a title of the document, an authority of the document, and a priority of the document.

* * * * *